(12) United States Patent
Pan et al.

(10) Patent No.: US 10,614,500 B2
(45) Date of Patent: Apr. 7, 2020

(54) IDENTIFYING SEARCH FRIENDLY WEB PAGES

(71) Applicant: BloomReach, Inc., Mountain View, CA (US)

(72) Inventors: Rong Pan, Santa Clara, CA (US); Haoxin Hu, San Jose, CA (US)

(73) Assignee: BloomReach, Inc., Mountain View, CA (US)

( * ) Notice: Subject to any disclaimer, the term of this patent is extended or adjusted under 35 U.S.C. 154(b) by 1113 days.

(21) Appl. No.: 14/825,716

(22) Filed: Aug. 13, 2015

(65) Prior Publication Data

US 2017/0046763 A1 Feb. 16, 2017

(51) Int. Cl.
*G06Q 30/00* (2012.01)
*G06Q 30/06* (2012.01)
*G06F 16/955* (2019.01)

(52) U.S. Cl.
CPC ..... *G06Q 30/0625* (2013.01); *G06F 16/9566* (2019.01)

(58) Field of Classification Search
USPC ................................................ 705/26.1–27.2
See application file for complete search history.

(56) References Cited

U.S. PATENT DOCUMENTS

| 2006/0167864 A1* | 7/2006 | Bailey | G06F 17/30864 |
| 2009/0125492 A1 | 5/2009 | Hughes et al. | |
| 2011/0302653 A1* | 12/2011 | Frantz | G06F 21/552 726/22 |
| 2014/0074629 A1* | 3/2014 | Rathod | G06Q 10/10 705/14.73 |
| 2014/0164352 A1 | 6/2014 | Denninghoff | |

OTHER PUBLICATIONS

Yang Song, Nam Nguyen, Li-wei He, Scott Imig, and Robert Rounthwaite. 2011. Searchable web sites recommendation. In Proceedings of the fourth ACM international conference on Web search and data mining (WSDM '11). ACM, New York, NY, USA, 405-414. DOI: https://doi.org/10.1145/1935826.1935890 (Year: 2011).*

* cited by examiner

*Primary Examiner* — Jason B Dunham
*Assistant Examiner* — Anand R Loharikar
(74) *Attorney, Agent, or Firm* — Moser Taboada

(57) ABSTRACT

A system for evaluating web pages for searchable content can be utilized to make an e-commerce search engine more effective by identifying pages with searchable value. In embodiments, a web page exhibiting "searchable value" is a page that provides useful information responsive to a user's query on an e-commerce search engine. One embodiment of a page evaluation system includes a web crawler module, a page analysis module, and a page index module. Web pages may be fetched and evaluated for various signals that indicate whether the web page exhibits searchable value. Examples of signals that may indicate that a web page lacks searchable value include a product page that does not have a product name nor a product image and a category page that does not have products listed in the page content. Web pages that lack searchable value may be excluded from subsequent e-commerce search results.

7 Claims, 4 Drawing Sheets

IDENTIFYING SEARCH FRIENDLY WEB PAGES

BACKGROUND

Generally, consumers may search for products by entering queries in search engines on e-commerce websites. Results for such queries may include web pages that have information about one or more products that are of interest to consumers and relevant to the submitted query. Commonly, a web page that includes information regarding a product may be referred to as a "product page." Products may be organized into one or more categories. A category page may be provided that includes links to product pages that fall under each category to aid consumers in finding selected products.

However, many e-commerce website search engines have inefficiencies due to a large quantity of product and category pages to index. Many web pages that are indexed do not contain information that is useful to consumers and therefore are irrelevant to the e-commerce search. Such irrelevant web pages may have been automatically generated without any content of interest to consumers. These irrelevant web pages may be numerous and can interfere with a consumer's ability to find relevant web pages. If an e-commerce website search result is dominated by numerous irrelevant web pages, a consumer may be less likely to search for products on that e-commerce website.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
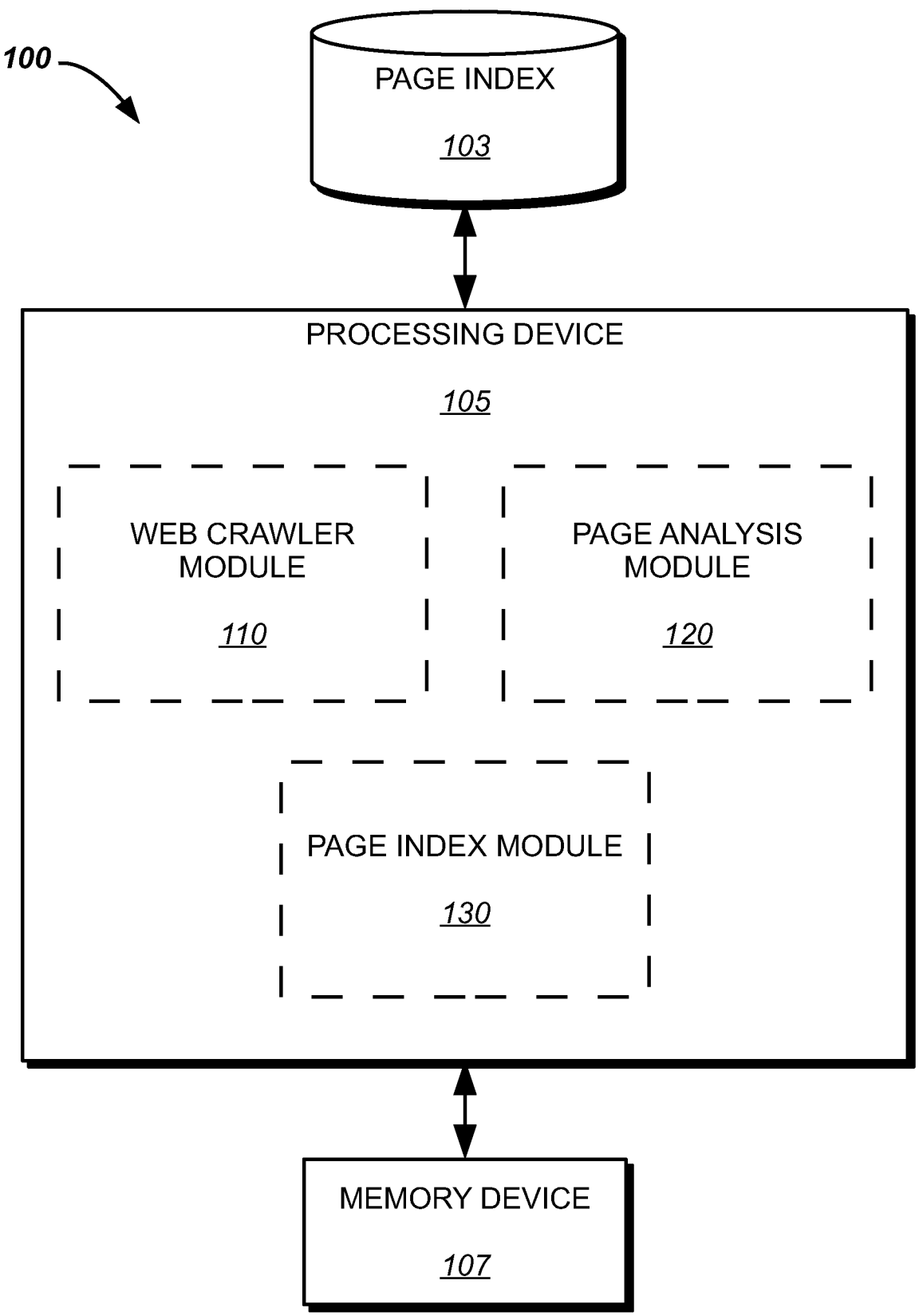
FIG. 1 is a block diagram illustrating a page evaluation system according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for automatically evaluating a retrieved web page to identify if the web page has value for searching. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, systems and methods described herein are adapted to evaluate if a retrieved page has value for searching. FIG. 1 is a block diagram depicting a page evaluation system 100 according to one embodiment of the present disclosure. In an embodiment, page evaluation system 100 includes a processing device 105 and memory device 107. In one embodiment, memory device 107 has computer-readable instructions to direct processing device 105 to include a web crawler module 110, a page analysis module 120, and a page index module 130.

Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Various embodiments of the present disclosure include page index 103. According to one embodiment, page index 103 comprises a data set of web pages crawled, analyzed, and indexed by page evaluation system 100. In embodiments, page index 103 includes metadata regarding each web page. According to various embodiments, page index 103 can receive said data from web crawler module 110, page analysis module 120, and/or a page index module 130.

In one embodiment, web crawler module 110 is adapted to submit requests to web servers for selected web pages and receive the web page in response. In one embodiment, web crawler module 110 can systematically process each page from a queue of provided URLs. In another embodiment, web crawler module 110 can systematically browse one or more seed URLs and download the web page for each. As additional URL links are identified on each downloaded web page, they may be added to a list of URLs to request. In embodiments, web crawler module 110 can selectively visit only URLs that meet predetermined criteria. In one embodiment, said criteria may indicate that the web page to be retrieved contains product information. In one embodiment, each potential URL is parsed into URL substrings and each substring may be analyzed for the presence of particular terms that indicate that the web page contains relevant information. In other embodiments, other criteria for following links can be applied to meet specific circumstances to seek particular information.

In one embodiment, web crawler module 110 is configured to downloads selected web pages and transmit each web page to page analysis module 120 for further processing. In one embodiment, web crawler module 110 collects and transmits web page content from each selected web page. In another embodiment, web crawler module 110 additionally collects HTML metadata from the web page, such as metatags, web page headers, and other information embedded in the web page response. In other embodiments, web crawler module 110 collects additional metadata regarding the circumstances of the web page download. For example, web crawler module 110 can collect the time and date of the download, the URL, the web page from which the URL link was retrieved, relevant URL substrings, HTTP status codes, redirections, HTTP header fields, search terms input into a search engine, or other information that may be analyzed.

According to various embodiments of the present disclosure, page analysis module 120 is adapted to receive downloaded web pages and collected metadata from web crawler module 110 and analyze said web pages and associated metadata to ascertain the searchable value of the web page as will be set forth in further detail below. In embodiments, page analysis module 120 conducts analysis of downloaded web pages and metadata according to data processing rules. In one embodiment, site-specific data processing rules are configured for each website that page analysis module 120 crawls. In one embodiment, the general and/or site-specific data processing rules are entered by human operators. In other embodiments, the data processing rules are generated by computer processes operating under machine-learning techniques or other automated or semi-automated methods.

According to embodiments, page analysis module 120 can parse the content of web pages crawled by web crawler module 110 and analyze according to the data processing rules in effect. Among other web page content, embodiments of page analysis module 120 are adapted to identify information related to one or more product listings on the web page, including product detail content, product listing content, metadata and HTML metadata regarding the product, product name, product image, product description, product category, and the like. Additionally, embodiments of page analysis module 120 are adapted to determine if the web page is a product page and/or a category page. A determination of whether the web page is a product page or a category page may be carried out by analyzing the web page content, the web page URL, the HTML metadata, or other data related to the web page. As used herein, a product web page may be an e-commerce web page describing and/or offering for sale one or more products. As used herein, a category web page may be an e-commerce web page describing one or more categories and/or showing a list of products that fall under the one or more categories.

According to embodiments, page analysis module 120 is adapted to examine the web page HTTP code, the web page URL, the web page redirections, web page HTTP status code, and other data relating to each web page and determine if the page has searchable value. As used herein, a web page exhibiting "searchable value" is a page that provides useful information responsive to a user's query on an e-commerce search engine. Examples of web pages with searchable value include web pages that include content related to particular products and/or categories for which the user was searching.

In one embodiment, page analysis module 120 is adapted to transmit data regarding web pages found to have searchable value to page index module 130. Data transmitted to page index module 130 may include web page content, the web page URL, the HTML metadata, or other data related to the web page. Page index module 130 is configured to store data received from page analysis module 120 at page index 103. Data stored at page index 103 can subsequently be searched according to users' search queries to find and return web page content from pages that were found to exhibit searchable value. In one embodiment, page analysis module 120 outputs metadata that indicates whether each web page has searchable value. In cases where a web page does not have searchable value, page analysis module 120 outputs metadata that indicates the reason(s) why the web page was found to be not searchable.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

According to embodiments, modules 110, 120, and/or 130 may communicate with each other via one or more networks. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

Figure 2:
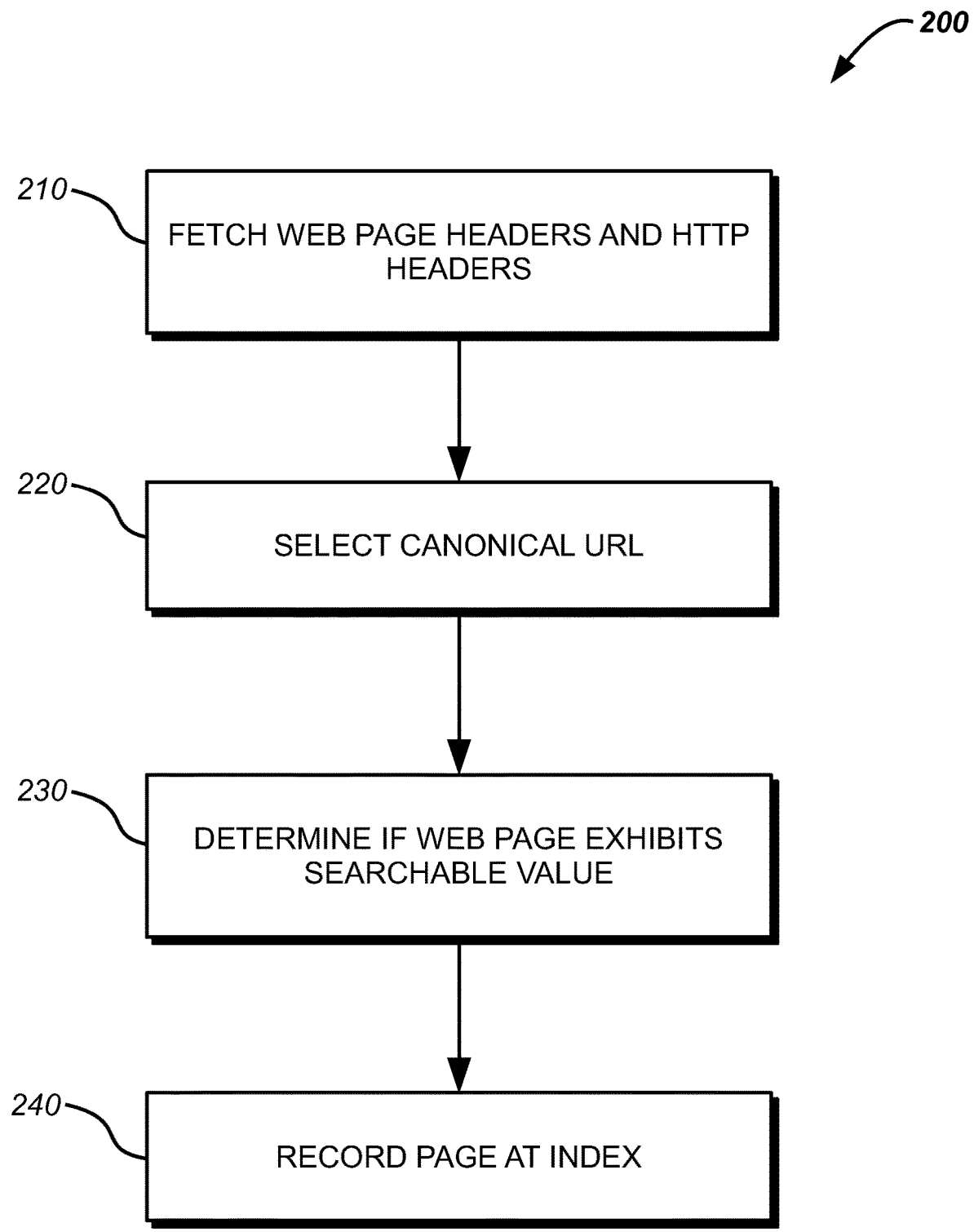
FIG. 2 is a flow-chart illustration of a method for evaluating web page and HTTP headers according to one embodiment of the present disclosure.

In operation, embodiments of the present disclosure may analyze web pages to determine if said web pages have searchable value. Referring now to FIG. 2, a process 200 for analyzing web pages is depicted according to one embodiment of the present disclosure. Process 200 begins at FETCH WEB PAGE HEADERS AND HTTP HEADERS 210. At operation 210, web crawler module 110 requests a web page from a list of URLs to request. In one embodiment, the list of URLs to request comprises one or more seed URLs. In one embodiment, the list of URLs to request includes URLs that have been gathered by web crawler module 110 as links from other web pages it has crawled. Once the requested web page has been downloaded, web crawler module 210 fetches the web page headers and HTTP headers for subsequent evaluation.

Process 200 proceeds to SELECT CANONICAL URL 220 for each web page retrieved in operation 210. In one embodiment, if a rel="canonical" link element is found, then the indicated URL may be selected as the canonical URL for the web page. In embodiments, if a URL includes a redirect to another web page, the destination URL may be assumed to be the canonical URL. For example, a 301 redirect may be commonly used to direct visitors to a canonical URL. If there is not a canonical URL indicated by a rel="canonical" link element, or a redirect, page analysis module 120 can select a canonical URL using other factors.

Process 200 proceeds to DETERMINE IF WEB PAGE EXHIBITS SEARCHABLE VALUE 230, where page analysis module 120 analyzes the HTTP code, the URL, and/or any HTTP redirections received in connection with the web page requested at operation 210. In embodiments, page analysis module 120 is configured to determine if the web page has searchable value. In one embodiment, page analysis module 120 can consider various factors and calculate a score that reflects the searchable value of the web page. In embodiments, page analysis module 120 identifies various signals that indicate that a web page lacks searchable value.

In embodiments, some such signals can be identified by comparing the web page URL with web page content. Certain web page URLs may indicate that the web page is a category page, a product page, or other type of page. For example, in some websites, category web pages may include a term such as "category," "categoryId," "category_id," "cat," or "cid" in the URL. In other websites, other terms may be used to identify a category web page. As additional examples, in some websites, product web pages may include a term such as "productId," "product_id," "prod," or "pid" in the URL. Likewise, the word "product" or other terms may identify web pages that are product pages. In embodiments, category web pages or product web pages may alternatively be identified by their HTML layout. Because some websites have web pages that are generated using web page templates, product pages may share a common HTML layout across a website and category pages may likewise share a common HTML layout across a website. By comparing the HTML layout of a selected page against HTML layouts of known product and category pages, page analysis module 120 can determine if the page under consideration has the template of a product page or of a category page and analyze it accordingly.

In an embodiment, if a web page URL indicates it is a category page, but there are no products listed on the page content, it may be assumed that the web page has no searchable value. In one embodiment, if a web page URL indicates it is a product page, but there is no product name with a product image in the page content or no product description with a product image in the page content, it may be assumed that the web page has no searchable value. In another embodiment, if web page content includes an HTML tag <meta> with "no-index" hint, it may be assumed that the web page has no searchable value. In another embodiment, if a web page redirects to a website home page; it may be assumed that the web page has no searchable value. In another embodiment, if a web page URL indicates it is a product page, but redirects to a non-product web page, it may be assumed that the web page has no searchable value. In another embodiment, if the web page URL indicates it is a category page, but redirects to non-category web page, it may be assumed that the web page has no searchable value. In another embodiment, if the web server returns a 4xx class HTTP status code for the web page, it may be assumed that the web page has no searchable value. In one embodiment, if the web server returns a 5xx class HTTP status code for the web page, it may be recorded that the web page's searchable value is indeterminate. The foregoing signals may therefore be interpreted as indicators that the web pages do not have searchable value.

In embodiments, if one or more of the foregoing signals are identified, then the web page may be deemed to lack searchable value. In other embodiments, each of the signals is assigned a weight and a score is calculated based on the number of signals identified. A score threshold may be instituted, such that if the aggregate score exceeds the threshold, the web page may be determined to lack searchable value.

Following operation 230, process 200 proceeds to RECORD PAGE AT INDEX 240, where page index module 130 records whether the web page has searchable value or not at page index 103. In one embodiment, page index module 130 can record if a web page has an indeterminate searchable value.

In embodiments, process 200 can be repeated as new URLs are added to the list of URLs to request or to reassess the searchable value of web pages that were previously analyzed. In particular, URLs that were previously found to have an indeterminate searchable value may be checked again according to process 200 within a relatively short time period. As each URL is checked a subsequent time, its status at page index module 130 can be updated to reflect the most recent analysis of the web page.

Figure 3:
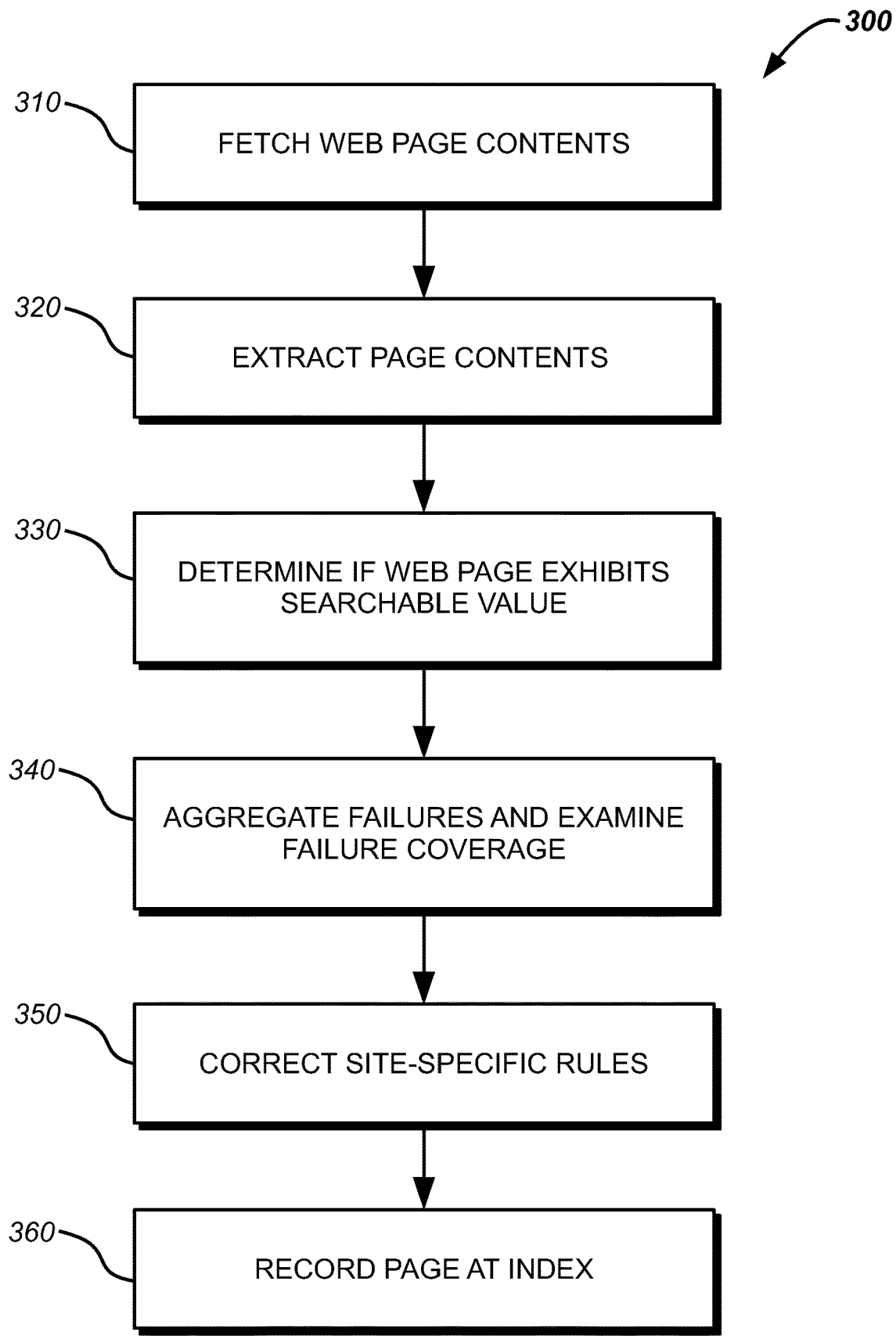
FIG. 3 is a flow-chart illustration of a method for evaluating web page content according to one embodiment of the present disclosure.

Referring now to FIG. 3, a process 300 for analyzing web pages is depicted according to one embodiment of the present disclosure. Process 300 begins at FETCH WEB PAGE CONTENTS 310. At operation 310, web crawler module 110 requests a web page from a list of URLs to request.

Process 300 proceeds to EXTRACT PAGE CONTENTS 320 for each web page retrieved in operation 310. In one embodiment, web crawler module 110 is configured to follow site-specific rules to extract the contents of each web page on the site. Site-specific rules may be generated manually or automatically according to web page layouts that are standardized in numerous web pages across a website. In one embodiment, site-specific rules reflect a detected arrangement of web page content and/or data on the web pages. In embodiments, such web page content may include product details, product listing, and/or metadata and HTML metadata.

Process 300 proceeds to DETERMINE IF WEB PAGE EXHIBITS SEARCHABLE VALUE 330, where page analysis module 120 analyzes the product detail content, product listing content, metadata, and/or HTML metadata received in connection with the web page requested at operation 310. In embodiments, page analysis module 120 is configured to determine if the web page has searchable value or not. In one embodiment, page analysis module 120 can consider various factors and calculate a score that reflects the searchable value of the web page. In embodiments, page analysis module 120 identifies various signals that indicate whether a web page has or lacks searchable value. In embodiments, some such signals can be identified by examining web page content including, but not limited to, product detail content, product listing content, metadata, and HTML metadata.

In embodiments, certain product web pages may be categorized as having either product detail content or product listing content. In one embodiment, product detail content can be examined to determine if a product name and/or product image are found in the content. If the product name and/or product image are not found in the web page content, it may be assumed that the web page has no searchable value. In one embodiment, product listing content can be examined to determine if a product listing can be found in the content. If no product listing can be found, it may be assumed that the web page has no searchable value. In one embodiment, web page metadata and HTML metadata can be examined. In another embodiment, if web page content includes an HTML tag <meta> with "no-index" hint, it may be assumed that the web page has no searchable value.

In an embodiment, if a web page content indicates it is a product detail content, but there is no product image and/or product name listed on the page content, it may be assumed that the web page has no searchable value. In one embodiment, if a web page content indicates it is a product listing content, but there is no list of product URLs, it may be assumed that the web page has no searchable value. In another embodiment, web page metadata and HTML metadata can be examined. If the web page content includes an HTML tag <meta> with "no-index" hint, it may be assumed that the web page has no searchable value. In one embodiment, if the web page has a size larger or smaller than predetermined thresholds, it may be assumed that the web page has no searchable value.

At operation 340, AGGREGATE FAILURES AND EXAMINE FAILURE COVERAGE, for any web page content that has a missing product name and image, missing product listing content, and/or other missing expected web page components, page analysis module 120 can collect and aggregate data regarding those missing web page components and then examine web page content to determine if the fetched web page content included said expected web page components but site-specific rules are misconfigured so the web page content was not accurately captured. In some cases, a change to the arrangement of data and/or content in pages of a website may cause the site-specific rules no longer match the website data and/or content arrangement and organization, and data extraction no longer results in desired content. In other words, the site-specific rules became obsolete due to changes in the website layout and/or organization. In embodiments, process 300 proceeds to CORRECT SITE-SPECIFIC RULES 350, where the site-specific rules are corrected to better fit the site content and/or the arrangement of content and data, including product detail content and product listing content.

In some cases, at AGGREGATE FAILURES AND EXAMINE FAILURE COVERAGE 340, it may be determined that the site-specific rules are not misconfigured, but the web page content under evaluation actually was missing a product name and image, product listing content, and/or other missing expected web page components. In such cases, it may be assumed that the web page has no searchable value.

In embodiments, if one or more of the foregoing signals are identified, then the web page may be deemed to lack searchable value. In other embodiments, each of the signals is assigned a weight and a score is calculated based on the number of signals identified. A score threshold may be instituted, such that if the aggregate score exceeds the threshold, the web page may be determined to lack searchable value.

In embodiments, process 300 proceeds to RECORD PAGE AT INDEX 360, where page index module 130 records whether the web page has searchable value or not at page index 103.

In embodiments, process 300 can be repeated as new URLs are added to the list of URLs to request or to reassess the searchable value of web pages that were previously analyzed. As each URL is checked a subsequent time, its status at page index module 130 can be updated to reflect the most recent analysis of the web page.

Figure 4:
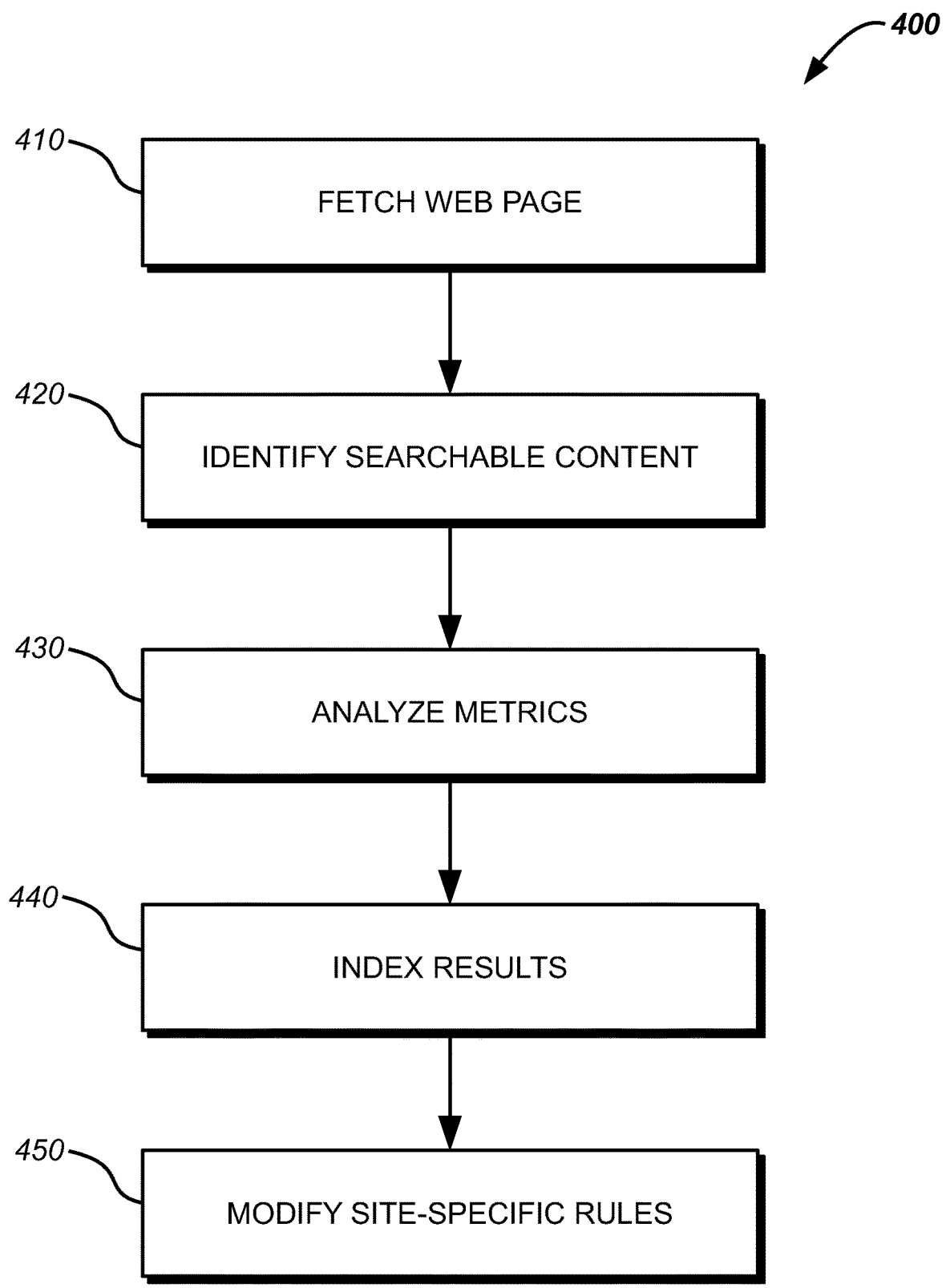
FIG. 4 is a flow-chart illustration of a method for processing a fetched web page according to one embodiment of the present disclosure.

Referring now to FIG. 4, a process 400 for analyzing web pages is depicted according to one embodiment of the present disclosure. Process 400 begins at FETCH WEB PAGE 410. At operation 410, a web page is fetched from a list of URLs to request. Web page content, web page metadata, and web page HTML metadata tags are collected for subsequent analysis.

Process 400 proceeds to IDENTIFY SEARCHABLE CONTENT 420. At operation 420, the fetched web page is evaluated to determine if it has searchable value. In embodiments, operation 420 may be carried out as process 200, process 300, combinations thereof, or other methods for determining if a web page contains searchable value. Operation 420 may output a determination of whether the web page under evaluation has searchable value and/or may output metadata related to the determination.

Following operation 420, process 400 proceeds to ANALYZE METRICS 430, where the output from operation 420 is analyzed to determine if conclusions regarding searchable content in various web pages were accurate. In one embodiment, process 430 comprises sampling checks on selected results from process 420. According to embodiments, analysis of the output from operation 420 may be carried out by a computerized process or by a human operator.

Operation 400 proceeds to INDEX RESULTS 440, where data from operations 410, 420, and/or 430 are stored. According to various embodiments, such data may include web page content, a data structure representation of web pages, web page URLs, HTML metadata, or other data related to the web pages.

At MODIFY SITE-SPECIFIC RULES 450, the results of ANALYZE METRICS 430 may be utilized to optimize site-specific data processing rules. In embodiments, if site-specific rules are misconfigured or obsolete, web page content may not be accurately captured. In such cases, at MODIFY SITE-SPECIFIC RULES 450, site-specific rules are corrected to better fit the website content and capture relevant content and/or web page metadata.

In embodiments, process 400 can be repeated as new URLs are added to the list of URLs to request or to reassess the effectiveness of site-specific rules. Further, as websites are updated and undergo changed web page structure, process 400 can be repeated to update site-specific rules.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method executed by a processor for identifying searchable content, the method comprising:
    requesting a selected URL from a list of URLs to request, the selected URL belonging to a website;
    receiving a set of site-specific rules for the website and following the site-specific rules to extract web page content from a web page of the website corresponding to the selected URL;
    determining whether the web page content comprises at least one of a product detail content, a product listing content, a category page, and metadata;
    determining whether the web page comprises a searchable value; and
    if the web page does not comprise a searchable value, determining if the set of site-specific rules for the website are misconfigured and if so, updating the site-specific rules for the website and returning to the extracting of the web page content from the web page using the updated site-specific rules.

2. The method of claim 1, wherein selecting to update the site-specific rules further comprises identifying that the site-specific rules are obsolete.

3. The method of claim 1, wherein determining whether the web page comprises searchable value further comprises identifying a signal indicating whether the web page lacks searchable value.

4. The method of claim 3, wherein the signal comprises identification of no product name and no product image in the product detail content.

5. The method of claim 3, wherein the signal comprises identification of no product listing in the product listing content.

6. The method of claim 3, wherein the signal comprises identification of no products listed in the category page.

7. The method of claim 3, wherein the signal comprises identification of no product description and no product image in product detail content.

* * * * *